May 24, 1932.  V. BUSH  1,859,580
VALVE
Original Filed Jan. 19, 1929
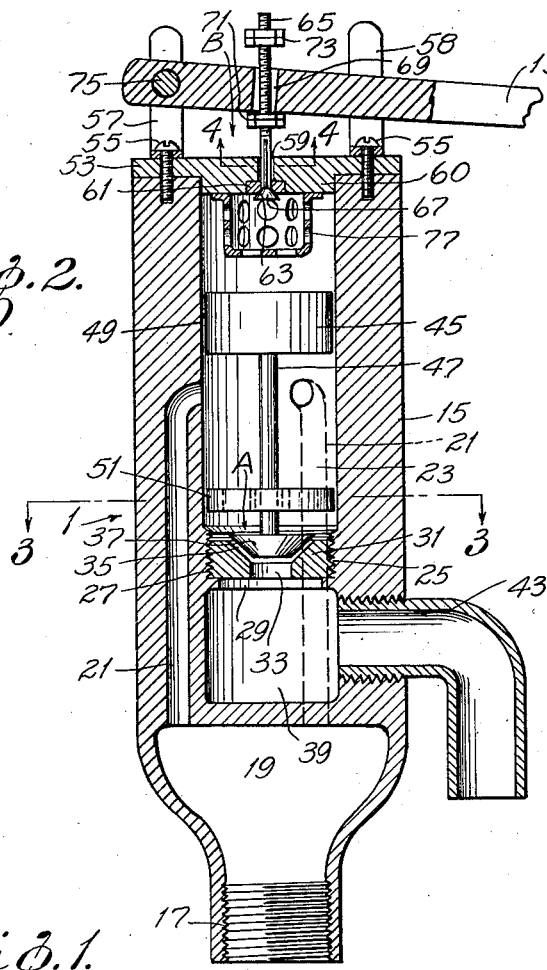

Patented May 24, 1932

1,859,580

UNITED STATES PATENT OFFICE

VANNEVAR BUSH, OF BELMONT, MASSACHUSETTS, ASSIGNOR TO SPENCER THERMOSTAT COMPANY, OF CAMBRIDGE, MASSACHUSETTS, A CORPORATION OF MASSACHUSETTS

VALVE

Application filed January 19, 1929, Serial No. 333,728. Renewed January 12, 1931.

This invention relates to valves, and with regard to certain more specific features, to ball float valves of a type adapted for use in flush tanks and the like.

Among the objects of the invention may be noted the provision of a valve of the class described which, when installed in flush tanks, will form a dependable and certain cut-off valve, so that the water flowing into the flush tank to refill it will not make objectionable noises in so doing; a valve which will not readily develop leaks; a valve which will cut off the flow of water quickly and positively, and a valve of the class described which is easily made, readily installed, and which is fool-proof. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated one of the various possible embodiments of the invention, Fig. 1 is an elevation of a flush tank, partly broken away, showing the parts of the invention in operating position;

Fig. 2 is a longitudinal section;

Fig. 3 is a cross-section taken on line 3—3 of Fig. 2; and,

Fig. 4 is a section taken on line 4—4 of Fig. 2.

Similar reference characters indicate corresponding parts throughout the several views of the drawings.

There are several marked disadvantages to the common type of ball float valves in use in, for example, flush tanks. Chief among these disadvantages are their tendency to leak and make highly undesirable sounds when in operation. In addition, they are disadvantageous because of the time consumed in filling the tank, which is unduly lengthened by the gradual throttling of the valve, allowing it to pass the water in full open position for only a very short time.

The undesirable noises may be explained in the following manner:

The liquid, in passing through the slowly closing valve, attains a high velocity and induces cavitation or the formation of small occlusions of air. The changing contours of these droplets of air combined with the unusual turbulence of the water in turn causes the rapid formation and deformation of voids. It is the breaking up and/or deformation of these voids that produces the noises.

The leaks are occasioned by the failure of the necessarily light float to hold the soft valve closing means tightly against the valve seat.

The present invention overcomes the above difficulties and provides a valve, as set forth in the objects, that is wide open for substantially the entire filling period, thereby greatly shortening that period, that eliminates the undesirable noises, and that reduces to a minimum the formation of leaks.

Referring now more particularly to Fig. 1, at numeral 1 is illustrated the valve in position in a flush tank 3. This flush tank 3 is provided with the customary flushing drain 5 and inlet pipe 7. An ordinary removable lid 9 is provided for purposes of inspection and the like.

The valve 1 is controlled by a buoyant ball float 11 supported upon a lever 13 in such a manner that the float 11 is enabled to float upon the liquid level in the tank 3 over a predetermined range. The valve 1 is arranged in the manner described hereinafter, to regulate the flow of water through inlet 7 and to stop or start said flow when the liquid level in tank 3, and therefore the ball float 11, reaches a predetermined elevation.

The valve 1 per se, illustrated more completely in Figs. 2 to 4, comprises a casting 15, preferably of brass or copper, which has an inlet end 17 adapted to receive said inlet pipe 7. Said inlet end 17 communicates with a chamber 19. Leading from said chamber 19 are a plurality of passages 21.

The central portion of the valve casting 15 is provided with a cylindrical chamber 23 therein. This chamber 23 is preferably cast in said valve casting 15 and afterwards machined. Located in the lower portion of said chamber 23 is a shoulder 25, formed integrally with the valve casting 15. This shoulder is threaded at 27, and a lip 29 is formed thereon so as to have a flat upper surface.

A valve seat 31 is formed of steel or the like to thread into said portion 27 of the shoulder 25 and rest against the lip 29. The valve seat 31 is provided with a central bore 33, having a countersunk upper side 35 thereon adapted to receive a stopper or valve head 37, to be described hereinafter.

It will be seen that the valve seat 31 and stopper 37 isolate a chamber 39 from the chamber 23. Threaded into said valve casing 15 at a point adapted to communicate with this chamber 39 is an outlet pipe 43.

A piston 45 on a shaft 47 is formed to fit into said machined central chamber 23. Sufficient clearance 49 is left between said piston 45 and the walls of said chamber 23 to permit said piston to move freely up and down therein, and to pass liquid between said piston and said walls. Affixed to the lower end of said shaft 47 in a central position thereon is said plug or stopper or valve head 37 adapted to fit into the valve seat 31 and form a closing contact therewith. A perforated guide spider 51 is affixed to said shaft 47. Said perforated spider 51 (shown in more detail in Fig. 3) slides loosely in the chamber 23 and aids in maintaining the shaft 47 centrally located in said chamber 23.

The passages 21 are preferably made by casting the casing 15 about copper, brass or like tubes properly positioned in the mold. However, they may be bored directly into the finished casting. These passages 21 open into said chamber 23 at a point preferably between said piston 45 and said washer 51. The lateral position of the passages 21 is shown in Fig. 3.

The casting 15 is capped by a cover portion or cap 53, which is held thereto by bolts 55. These bolts 55 also hold U-supports 57 and 58 to said casting 15. The cover 53 has a portion 60 thereon which fits snugly into the chamber 23 and forms a sealing contact therewith.

Located centrally in said cover 53 is a cylindrically bored passage 59. A steel valve seat 61, with a conical portion 63, is threaded into the lower portion of said cover 53 in alignment with said passage 59.

Passing through the passage 59 is a stem 65 with a valve closing plug or stopper or head 67 on the lower end thereof adapted to engage with the conical portion 63 of said valve seat 61. The stem 65 is splined or grooved, as shown in Fig. 4, to allow liquids to pass from said chamber 23 out through said passage 59 when the plug 67 is not in position in the valve seat 61.

As will be seen hereinafter, the valve seat 61 and the plug 67 together comprise a relay valve B which operates by opening and closing to affect the operation of the larger valve A, the latter comprising the valve seat 31 and the plug 37.

The outer end of the stem 65 is threaded and passes through a central opening 69 in said lever 13. Affixed to said stem 65 on either side of said lever 13 are pairs of lock nuts 71 and 73 respectively. These lock nuts 71 and 73 permit adjustment of the operative range of the lever 13.

The lever 13 is supported with its fulcrum on a shaft 75 passing through the legs of one U-support 57. The second U-support 58 serves to guide the lever 13, which is placed between the legs thereof, and to restrict its motion to a vertical oscillation. The U-supports 57 and 58 are affixed to the casting 15 by means of the bolts 55, which also hold said cover 53 thereto.

A guard 77 is soldered or otherwise affixed to the under side of the cover 53 to prevent the piston 45 from rising too far and jamming the valve plug 67 closed in the valve seat 61. This guard may comprise a perforated metal cap, as in the present embodiment, or the like.

The operation of the valve is as follows:

Normally, with a full tank, the water pressure in the inlet line 7 holds both valves A and B closed. The ball float 11 floats on the surface of the water in the tank 3 and the lock nuts 71 and 73 are arranged on the stem 65 so that the valve B is then closed. In operation, the water is drained from tank 3 and the ball float 11 sinks with the falling water level therein, thereby opening the relay valve B. Inasmuch as the valve B is small, it is not necessary to have a particularly large ball float 11.

When the valve B has been opened, water rushes out through the passage 59, and the pressure between the piston 45 and the cover 53 decreases. The full pressure on the under side of the piston 45 therefore reacts to cause said piston 45 to rise until it is stopped by the guard 77, thereby opening valve A and permitting the water to run from inlet line 7 through the valve A and the outlet 43 into the tank 3. The water level therefore commences to rise in said tank 3. The relatively small bore of the passages 21 gently throttles the pressure of the now fast-flowing water, and noises due to passage through the valve are therefore minimized. It is a well-known fact that throttling action on a liquid in a tube produces practically no noise, while the same throttling action in a valve, around the sharp edges thereof, causes considerable noise. This is probably due to the absence of cavitation in the former case.

The water level increases until the float 11, reacting through the lever 13 and the lock nuts 73 on the stem 65, causes the relay valve B to close. The pressure on the piston 45 then becomes equal on both sides, and the piston gravitationally sinks to close the valve A quickly and positively and to stop the flow of water into the tank 3. The suction caused by the flowing water beneath the plug 37, when the relay valve B closes and before the valve A closes, supplements the action of gravity in closing the valve A; and in some cases, such as, for example, when the valve 1 is not in the vertical position shown, it alone is sufficient to cause the closing of said valve A.

The moving parts of the apparatus are all lubricated by the flowing water. The metal-to-metal valves provide a positive and quick sealing action, eliminating the slow seal and leakage of the old washer type of valve.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. The ball float valve for use in flush tanks and the like which comprises a valve casing, an inlet chamber in said casing, said inlet chamber being adapted to communicate with a pipe line, a central chamber in said casing, passages in said casing communicating between said inlet chamber and said central chamber, said passages being of relatively small bore adapted to minimize noises due to throttling therein, a valve in said central chamber, outlet means from said central chamber positioned below said valve, a relay valve positioned above said first-mentioned valve, and means comprising a float for actuating said relay valve.

2. A valve for use in flush tanks and the like which comprises a valve casing, an inlet chamber in said casing, a central chamber in said casing, at least one passage in said casing communicating between said inlet chamber and said central chamber, said passage being adapted to minimize noises due to throttling therein, outlet means from said central chamber, valve means in said chamber for restricting and permitting flow from said inlet chamber to said outlet means and actuating means for said valve means surmounted on said casing.

3. A valve for use in flush tanks and the like which comprises a valve casing, an inlet chamber in said casing, a central chamber in said casing, at least one passage in said casing communicating between said inlet chamber and said central chamber, said passage being adapted to minimize noises due to throttling therein, outlet means from said central chamber, a valve in said central chamber, outlet means from said central chamber positioned below said valve, a relay valve in said casing positioned above said first-mentioned valve, and means for actuating said relay valve mounted on the top of said casing.

In testimony whereof, I have signed my name to this specification this 14th day of January, 1929.

VANNEVAR BUSH.